United States Patent [19]
Dane

[11] 4,057,730
[45] Nov. 8, 1977

[54] CHART VIEWER

[76] Inventor: George E. Dane, 1546 21st St., Manhattan Beach, Calif. 90266

[21] Appl. No.: 679,724

[22] Filed: Apr. 23, 1976

[51] Int. Cl.[2] .......... G01N 21/38
[52] U.S. Cl. .......... 250/461 R
[58] Field of Search .......... 250/458, 459, 461 R, 250/462, 463

[56] References Cited

U.S. PATENT DOCUMENTS

| | | | |
|---|---|---|---|
| 3,487,210 | 12/1969 | Hubert | 250/461 R |
| 3,774,046 | 11/1973 | Hoch et al. | 250/461 R X |
| 3,842,281 | 10/1974 | Goodrich | 250/461 R |

FOREIGN PATENT DOCUMENTS

| | | | |
|---|---|---|---|
| 694,359 | 7/1940 | Germany | 250/461 R |
| 338,978 | 7/1959 | Switzerland | 250/461 R |

*Primary Examiner*—Davis L. Willis
*Attorney, Agent, or Firm*—John Holtrichter, Jr.

[57] ABSTRACT

A device to be used in a darkened cockpit of an aircraft and the like in night flying or driving conditions for supporting in the device a chart treated with a fluorescent material, the device including an ultraviolet light source, means for directing the ultraviolet light energy from the source to the upper surface of the chart causing it to glow, and a filter disposed above the chart at the upper portion of the device which allows the fluorescent glow to be viewed therethrough while preventing glare-producing light rays from leaving the device.

20 Claims, 7 Drawing Figures

CHART VIEWER

BACKGROUND OF THE INVENTION

The background of the invention will be set forth in two parts.

FIELD OF THE INVENTION

This invention relates to aids to navigation and more particularly to devices for supporting charts, instructional plates, etc., to be viewed under night operating conditions.

DESCRIPTION OF THE PRIOR ART

It has long been the practice by those navigating at night in vehicles such as aircraft to shine a flashlight or special red-filtered navigation light on a navigational chart or map, since to illuminate the cockpit with white light sufficiently to enable one to read the chart would necessarily blind the pilot or driver to anything outside the vehicle.

A combination of "red" and "white" light is currently used in the cockpit environment for night flying. In order to read aeronautical charts, approach plates, check lists, etc., the pilot, co-pilot or navigator must increase the intensity of these lights to a level commensurate to his visual requirements for reading. This change in the physical light levels can have an adverse effect on the pilot's vision for a period of time depending on the condition of his eyes and the degree of sensitivity he may have toward "night blindness."

It has also been found that portable flashlights do not uniformly illuminate a chart for easy viewing, and undesirable glare may reflect from the glass in the many cockpit instruments and from the cockpit's windshield to severely limit outside visibility of the pilot.

There has been some use of long wave ultraviolet (U-V) light, sometimes known as black light, for illuminating navigational instruments. This type of light energy has a short wavelength and is located at the high frequency end of the visible light electromagnetic spectrum. This type of light has the characteristic of causing certain minerals and special fluorescent inks and dyes to "glow" in sometimes spectacular colors and patterns. The use of this type of illumination has been considered in conjunction with fluorescent inks as a possible means of allowing cockpit viewing of specially treated charts, etc., but it has been found that the reflection of the U-V light, as well as the intense glow of the fluorescent material may cause an unsatisfactory glare condition. It should therefore be evident that a device that can support an ultraviolet light-illuminated chart and allow the viewing thereof without subjecting the darkened cockpit enclosure to glare problems would constitute a significant advancement of the art.

SUMMARY OF THE INVENTION

In view of the foregoing factors and conditions characteristic of the prior art, it is a primary object of the present invention to provide a new and improved chart viewer.

Another object of the present invention is to provide a cockpit chart viewer utilizing a U-V light source, which viewer is adapted to allow the use of charts treated with an untraviolet-sensitive material.

Still another object of the present invention is to provide a night flying cockpit chart viewer that does not introduce undesirable glare conditions.

Yet another object of the present invention is to provide a lightweight and reliable chart viewer.

Still a further object of the present invention is to provide a night reading chart viewer which improves the reading capability of charts, approach plates, check lists, and other printed material, while maintaining the lowest possible visible light level in the cockpit and avoiding the impairment of the vision caused by changes in the visible light levels.

In accordance with one embodiment of the present invention, a chart viewer is provided for viewing charts in a darkened cockpit environment and the like under night flying conditions, the device including a housing having an upper portion and a lower chart-supporting portion adapted to support a chart to be viewed from above the upper portion of the housing. Illumination means such as reflectors and the like are disposed in the housing and associated with the U-V light source for directing the U-V light toward an upper surface of a chart supported by the housing's chart-support portion. The invention further includes filter means mounted on the housing at its upper portion for preventing glare producing light rays from leaving the housing while allowing the viewing of the chart therethrough.

The light source may be an elongated tubular U-V lamp that is energized by a self-contained battery power supply or by an external source of power. The chart may be slipped into the viewer through a slot in the housing, placed on a sliding tray that is moved into the housing, or the chart can be in strip form and supported by a pair of reels, for example.

The features of the present invention which are believed to be novel are set forth with particularity in the appended claims. The present invention, both as to its organization and manner of operation, together with further objects and advantages thereof, may best be understood by making reference to the following description, taken in conjunction with the accompanying drawings in which like reference characters refer to like elements in the several views.

DESCRIPTION OF THE PREFERRED EMBODIMENTS

Figure 1:
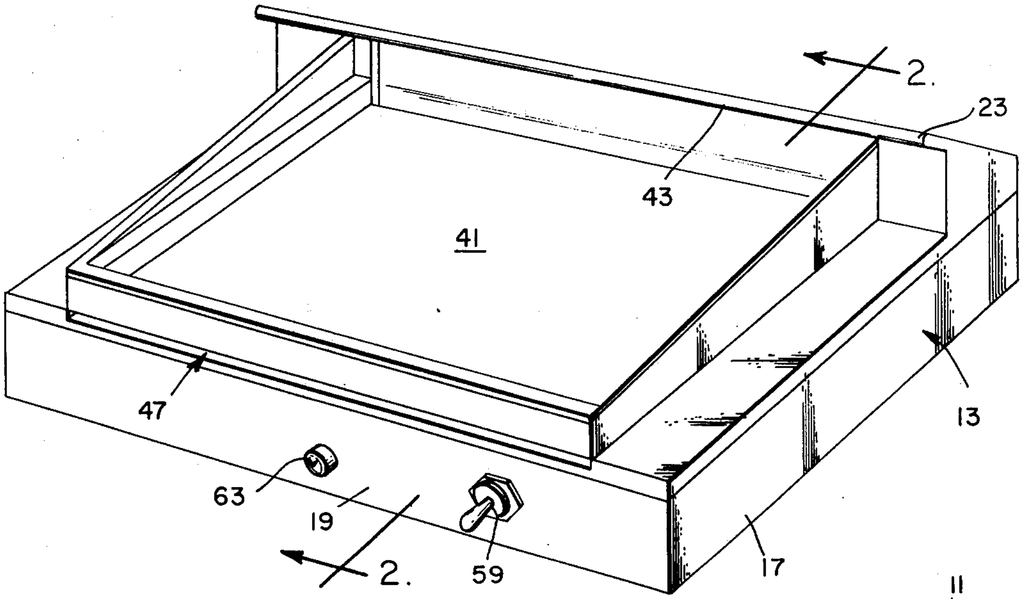
FIG. 1 is a perspective view of a chart viewer in accordance with an embodiment of the present invention.
Figure 2:
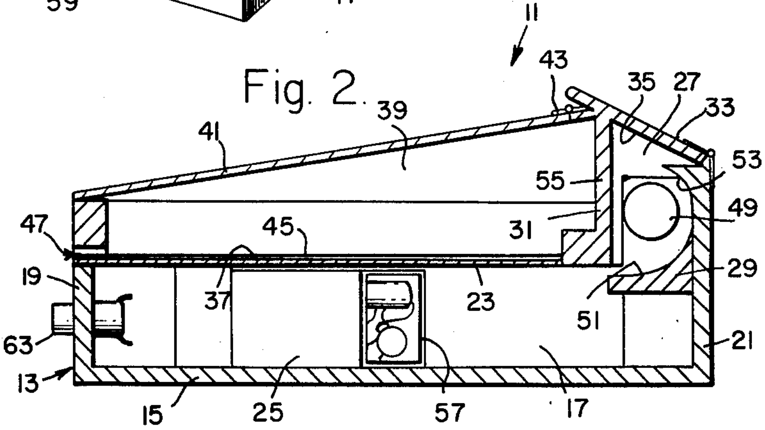
FIG. 2 is a side elevational view, in section, of the viewer of FIG. 1 taken along line 2—2.

Referring now to the drawings and more particularly to FIGS. 1 and 2, there is shown a chart viewer 11 having a generally rectangular housing 13 with a base plate 15, side walls 17, a front wall 19, and a rear wall 21. In this embodiment, the housing 13 also includes a horizontal planar interior base member 23 parallel to and spaced above the base plate 15 to define a lower compartment 25. An elongated lamp compartment 27 is provided along the rear wall portion of the housing by an acruate reflector member 29, a vertical inner wall 31, and an upper wall 33 having an inner surface 35 adapted to reflect light energy incident thereon toward an upper surface 37 of the base member 23. Disposed above and in spaced relation to the base member 23 and forming an upper or chart compartment 39 is a transparent glare filter 41. In this embodiment, the filter 41 is disposed at an angle with respect to the horizontal and is hinged along its rear extremity by a conventional piano or plastic hinge 43.

A chart 45 may be introduced into the upper compartment 39 by pushing it through an elongated horizontal slot 47 in the front wall 19 adjacent the upper surface 37 of the base member 23. The chart 45 is printed on paper or other suitable material that produces a high intensity fluorescent glow when subjected to long-wave U-V light, and when used with standard black printing ink, a high contrast is provided to the paper.

In accordance with the present invention, long wave ultaviolet light is produced by activating a conventional elongated tubular long-wave U-V lamp 49 that is disposed in the lamp compartment 27. This light is directed by means of a concave curved surface 51 of the member 29, a curved inner portion 53 of the rear wall 21 and the inner surface 35 through an opening 55 in the inner wall 31 toward the upper printed surface of the chart 45 in the chart compartment 39. It will be noted that this configuration is just one of several schemes that may be utilized in order to direct black light energy uniformly on the upper surface of the chart. Also, it should be noted that the transparent glare filter 41 plays an indispensible role in keeping nearly all of the U-V light energy from leaving the housing 13 while allowing the viewing of the specially treated chart.

Figure 3:
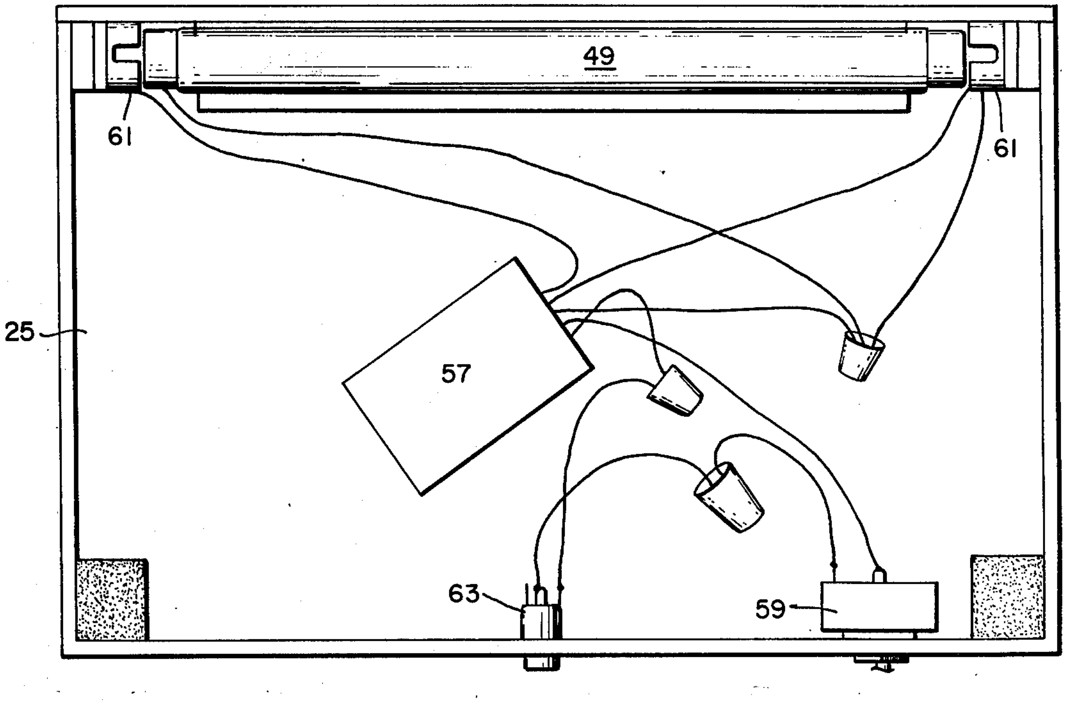
FIG. 3 is a top plan view of the base portion of the viewer of FIG. 1.

Referring now also to FIG. 3, there is shown the lower compartment 25 which houses conventional electrical circuitry that energizes the U-V lamp 49. This circuitry basically includes a power supply 57, a switch 59, a pair of U-V tube sockets 61, and an input power jack 63. The electrical circuitry required to energize the U-V lamp 49 is very well known in the art and no attempt will be made here to describe in detail the circuitry utilized for the various embodiments of the present invention. The power supply 57 may, for example, be of the solid-state type used to power popular portable fluorescent camping lanterns, and is coupled through the jack 63 to a source of direct current (not shown) such as a rechargeable nickel-cadmium battery or a battery normally carried by the vehicle in which the invention is to be used. Of course, the battery, if relatively small in size, could be mounted in the compartment 25, and the jack 63 utilized to couple charging current to it.

In operation, the chart 45, for example, is slipped through the slot 47 as shown in FIG. 2. The source of direct current (not shown) is plugged into the jack 63 and the switch 59 moved to its "on" position. This causes the energization of the U-V lamp 49 which in turn illuminates essentially the entire upper surface of the chart 45 with ultraviolet light rays causing the aforementioned U-V sensitive material thereon to glow and become visible to an observer viewing the device from above, through the filter 41. The upper surface of the chart 45 may be specially treated with an ultraviolet-sensitive material which enhances non-sensitive printing or ink, or only U-V sensitive outlines may be printed on untreated paper, for example.

Figure 4:
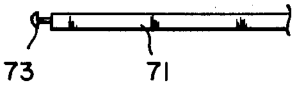
FIG. 4 is a partial view of a tray used in accordance with another embodiment of the present invention.

In accordance with another embodiment of the invention, illustrated in FIG. 4, a rectangular flat tray 71 having a knob 73, and dimensioned to slip through the slot 47, is adapted to support and transport a chart, such as chart 45, into the upper chart compartment 39.

Figure 5:
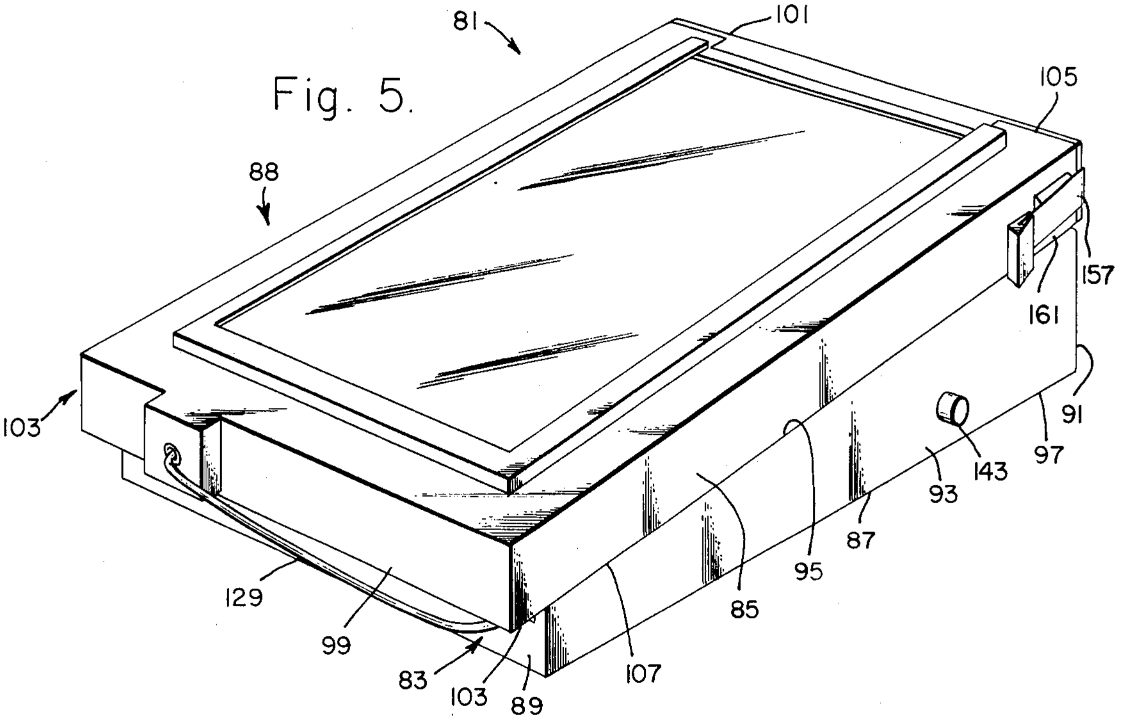
FIG. 5 is a perspective view of still another embodiment of the present invention.
Figure 6:
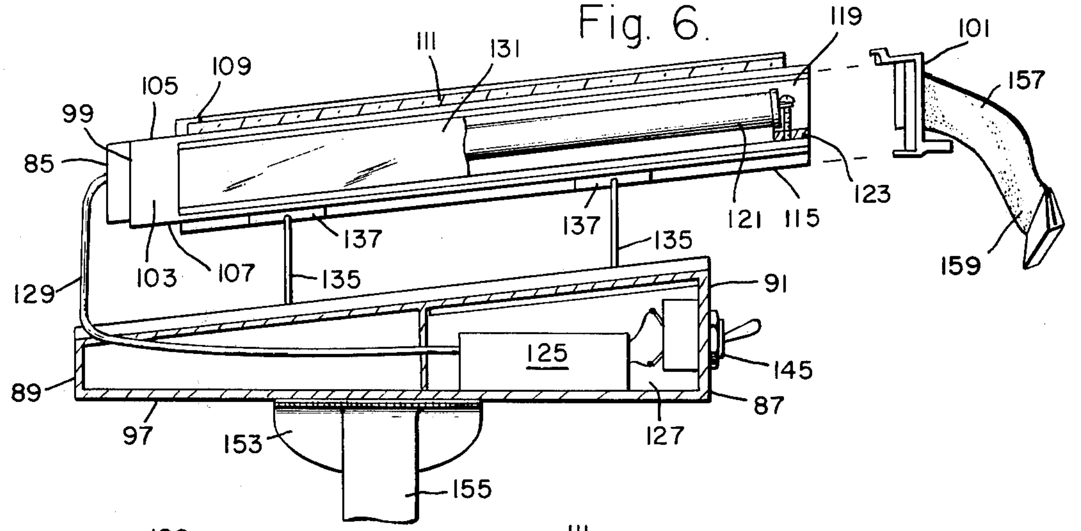
FIG. 6 is a sectional view, partially broken away, of the embodiment illustrated in FIG. 5.
Figure 7:
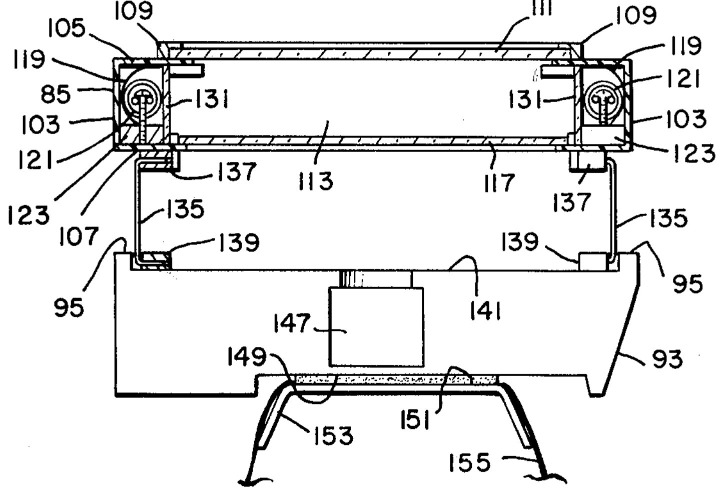
FIG. 7 is a rear end elevational view of the embodiment of FIG. 5 shown with its upper portion (shown in section) elevated above its lower portion.

Referring now to FIGS. 5–7, there is shown still another embodiment of the invention, herein identified by reference numeral 81. This embodiment includes a housing 83 having an upper first portion 85 and a separate lower second portion 87. The second portion 87 includes front and rear ends 89 and 91, respectively, sides 93, and an upper portion 95 inclined as shown with respect to a base 97. The first portion 85 is generally rectangular in shape and includes a front end 99, a removable rear end 101, sides 103, an upper portion 105 and a lower planar portion 107.

The upper portion 105 includes an upper frame 109 adapted to hold a transparent glare filter 111, similar to the filter 41, to allow viewing of a first compartment 113 in the first housing portion 85 from above the device 81. The portion 105 also includes a lower frame 115 supporting a clear transparent plate 117 of plastic material or glass, the plate 117 having generally the same dimensions as that of the filter 111.

Mounted in two oppositely disposed lamp compartments 119 adjacent the sides 103 are elongated U-V lamps 121, each such compartment being fitted with appropriate sockets 123 at each end of the lamps 121 and electrically connected to a power supply 125 located in a compartment 127 in the second portion 87 by a multiconductor electric cable 129. The power supply, lamps and sockets are similar to those components described previously. Further, in accordance with this embodiment of the invention, the upper portion 105 includes a filter 131 adjacent each lamp 121 for filtering out essentially all white light emitted by such lamps and thus preventing such undesirable light rays from entering the compartment 127. The filters 131 are generally deep purple in color and are opaque to white light but transparent to ultraviolet rays. The filters 131 and the filter 41 are commercially available items sold under various brand names, well known to those familiar with the U-V art.

As seen in FIGS. 6 and 7, the first housing portion 85 is movably supported above the second housing portion 87 by means of four arms 135 with bent ends, each pivotally anchored in associated upper and lower sockets 137 and 139. This structure allows the first portion 85 to be moved upward above and spaced from the lower housing portion 87 while maintaining a parallel relationship therebetween. In this manner, a single chart sheet or a portion of a chart book may be inserted and held between the two housing portions and supported on a planar upper surface 141 slightly recessed below the upper portion 95 of the second housing portion 87.

In operation, the upper housing portion 85 is lifted enough to allow a chart sheet or book (not shown) to be placed on the surface 141 after which the first portion is allowed to move down over the chart. A direct current source (not shown) is then connected by means of an input power jack 143 mounted in one of the sides 93 through a switch 145 to the power supply 125. When the switch is moved to its "on" position, the power supply 125 boosts the dc voltage supplied to the chart viewed to a magnitude sufficient to ignite and maintain U-V illumination output from the pair of U-V tubes 121.

The ultraviolet light propagates through the filters 131 and the transparent plate 117 onto the aforementioned chart to illuminate and cause to glow U-V sensitive materials disposed thereon. The phosphorescent glow from the excited material is then visible by a viewer looking through the filter 111, the latter filter acting to prevent the propagation of U-V light from the lamps 121 externally of the device 81.

The interior of the lamp compartments 119 may be painted silver or provided with any light reflective coating or layer to concentrate the light output from the lamps toward the associated filters 131. Also, finger accepting aperture 147 may be incorporated in the rear end 91 of the second housing portion 87 in order to facilitate the insertion, positioning and removal of a chart. The lower surface 97 of the housing portion 87 may be provided with a strip or strips 149 of material adapted to removably grip a mating material 151 attached to a U-shaped knee member 153. The member 153 is shaped to fit over the top of the upper leg of a person viewing the present device, and a flexible strip 155 is provided to encircle the leg and secure the member 153 thereto. This arrangement provides a convenient means for supporting the housing 81 and for viewing a chart disposed below the upper housing portion 85.

The rear end piece 101 may be removably attached to the upper housing 85 by any conventional means such as a flexible strap 157 having an inner surface 159 adapted to removably mate with and hold to a patch 101 of material attached to the sides 103 of the upper housing portion 85. Removal of the end piece 101 allows access to the U-V lamps, the filter plate 111 and the transparent plate 117. Of course, other means well known in the art may be employed to provide access to the plates and lamps.

From the foregoing it should be evident that there has herein been described a new compact and light weight chart viewer which allows a specially treated chart to be read while maintaining the lowest possible visible light level in the cockpit or driving compartment in order to avoid impairment to vision caused by changes in visible light levels.

Although specific materials and configurations have been described, other materials having the same or similar characteristics and configurations providing similar functions may be substituted therefor.

What is claimed is:

1. A chart viewing device for viewing in a darkened environment printed matter that has been at least partially treated with a long wave ultraviolet-sensitive fluorescent material, comprising:
   - a housing having an upper portion and a lower chart-supporting portion viewable from above said upper portion of said housing;
   - illumination means including a long wave ultraviolet light source disposed in said housing for illuminating the upper surface of said chart-supporting portion of said housing; and
   - filter means including a U-V filter mounted at the top of said upper portion of said housing for allowing the viewing of long wave ultraviolet light-stimulated fluorescent light produced within said housing, and for essentially preventing the transmission therethrough of ultraviolet light energy.

2. The device according to claim 1, wherein said U-V filter is a planar sheet having a filter characteristic essentially attenuating all transmission therethrough of long wave ultraviolet light energy.

3. The device according to claim 2, wherein said U-V filter is a transparent plastic sheet coated with a material having a relatively high absorptive characteristic in the 3,600 A range.

4. The device according to claim 1, wherein said housing includes a chart-accepting aperture communicating with said upper surface of said chart-supporting portion of said housing.

5. The device according to claim 4, wherein said aperture is elongated with its longitudinal axis immediately adjacent to and above said upper surface of said chart-supporting portion.

6. The device according to claim 5, wherein said aperture is fixed in dimension.

7. The device according to claim 6, also comprising a planar chart tray dimensioned to be slidably disposed through said aperture and immediately above said upper surface of said chart-supporting portion.

8. The device according to claim 1, wherein said upper portion and said lower chart-supporting portions of said housing are separable to a predetermined extent to define an expandable, elongated chart-accepting aperture to said upper surface of said chart-supporting portion.

9. The device according to claim 8, wherein said housing includes housing-connecting arms pivotally attached at one of their ends to said upper portion and at the other of their ends to said lower chart-supporting portion.

10. The device according to claim 1, wherein said ultraviolet light source is an ultraviolet light-emitting U-V lamp, said illumination means also including lamp energizing electrical circuitry electrically connected to said U-V lamp.

11. The device according to claim 10, wherein said U-V lamp is elongated and its longitudinal axis is parallel to the plane of said upper surface of said chart-supporting portion of said housing.

12. The device according to claim 10, wherein said housing includes a lamp compartment housing said U-V lamp, said compartment including light reflecting means for directing light energy from said U-V lamp toward said upper surface of said chart-supporting portion.

13. The device according to claim 1, wherein said ultraviolet light source is a pair of ultraviolet light-emitting U-V lamps, said illumination means also including lamp-energizing electrical circuitry electrically connected to said U-V lamps.

14. The device according to claim 13, wherein said U-V lamps are elongated and are disposed in said housing with their longitudinal axes parallel to each other and parallel to the plane of said upper surface of said chart-supporting portion of said housing.

15. The device according to claim 14, wherein said U-V lamps are disposed at opposite sides of said housing above and adjacent to opposite sides of said upper surface of said chart-supporting portion.

16. The device according to claim 1, wherein said ultraviolet light source includes at least one U-V lamp, and wherein said housing includes a lamp compartment for each lamp, said compartment including a light exiting opening therein, and further comprising white light filter means disposed in said opening in said compartment for essentially allowing only ultraviolet light energy from leaving said compartment.

17. A viewing device for viewing in a darkened environment objects that have been at least partially treated with a long wave ultraviolet-sensitive fluorescent material, comprising:

a housing having an outer viewing portion;

illumination means including at least one long wave ultraviolet light source disposed in said housing for illuminating an object at least partially treated with a long wave ultraviolet-sensitive fluorescent material which gives off a fluorescent light when so stimulated;

filter means including an ultraviolet filter mounted in said outer viewing portion of said housing for allowing the viewing of the long wave ultraviolet light-stimulated fluorescent light produced within said housing, and for essentially preventing the transmission therethrough of ultraviolet light energy.

18. The device according to claim 17, wherein said housing includes at least one lamp compartment, and wherein said long wave ultraviolet light source is a U-V lamp disposed in said lamp compartment, said lamp compartment having a light energy-exiting port.

19. The device according to claim 18, wherein said illumination means also includes white light filter means disposed in said light energy-exiting port for allowing essentially only long wave ultraviolet light energy produced within said lamp compartment from propagating therethrough.

20. The device according to claim 17, wherein said housing includes a chart-viewing portion.

* * * * *